United States Patent
Fadhel et al.

(10) Patent No.: US 11,286,160 B2
(45) Date of Patent: *Mar. 29, 2022

(54) NICKEL-CONTAINING CATALYST COMPOSITION HAVING ENHANCED ACIDITY FOR AUTOTHERMAL REFORMING PROCESSES

(71) Applicant: Saudi Arabian Oil Company, Dhahran (SA)

(72) Inventors: Bandar A. Fadhel, Dhahran (SA); Bandar H. Alsolami, Dhahran (SA); Rami Bamagain, Dhahran (SA); Mohammed A. Albuali, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 187 days.

This patent is subject to a terminal disclaimer.

(21) Appl. No.: 16/775,050

(22) Filed: Jan. 28, 2020

(65) Prior Publication Data
US 2021/0229992 A1    Jul. 29, 2021

(51) Int. Cl.
*C01B 3/40* (2006.01)
*B01J 23/755* (2006.01)
(Continued)

(52) U.S. Cl.
CPC ............... *C01B 3/40* (2013.01); *B01J 23/755* (2013.01); *B01J 23/78* (2013.01); *B01J 35/023* (2013.01);
(Continued)

(58) Field of Classification Search
CPC .............. C01B 3/40; C01B 2203/0244; C01B 2203/1058; C01B 2203/1082;
(Continued)

(56) References Cited

U.S. PATENT DOCUMENTS 3,186,797 A   6/1965 Perrett et al.
4,017,425 A   4/1977 Shiao
(Continued)

FOREIGN PATENT DOCUMENTS

CN   104627960 A   5/2015
CN   105478120 A   4/2016
(Continued)

OTHER PUBLICATIONS

Alharthi et al., "Hydrocarbon Cracking Over Red Mud and Modified Red Mud Samples," Journal of Sustainable Metallurgy 2:387-393, 2016.
(Continued)

*Primary Examiner* — Anthony J Zimmer
*Assistant Examiner* — Syed T Iqbal
(74) *Attorney, Agent, or Firm* — Bracewell LLP; Constance G. Rhebergen; Kevin R. Tamm

(57) ABSTRACT

Modified red mud catalyst compositions, methods for production, and methods of use in autothermal reforming, the composition comprising: red mud material produced from an alumina extraction process from bauxite ore; and nickel oxide, the nickel oxide present at between about 5 wt. % to about 40 wt. % of the modified red mud catalyst composition.

16 Claims, 2 Drawing Sheets

(51) Int. Cl.
  *B01J 23/78* (2006.01)
  *B01J 35/02* (2006.01)
  *B01J 35/10* (2006.01)

(52) U.S. Cl.
  CPC ......... *B01J 35/026* (2013.01); *B01J 35/1014* (2013.01); *C01B 2203/0244* (2013.01); *C01B 2203/1058* (2013.01); *C01B 2203/1082* (2013.01); *C01B 2203/1241* (2013.01)

(58) Field of Classification Search
  CPC .............. C01B 2203/1241; C01B 3/382; B01J 23/755; B01J 23/78; B01J 35/023; B01J 35/026; B01J 35/1014; B01J 2523/00; B01J 35/1019; B01J 35/0013; B01J 21/005; B01J 21/04; Y02P 20/52
  See application file for complete search history.

(56) References Cited

U.S. PATENT DOCUMENTS

| | | | |
|---|---|---|---|
| 4,451,578 A | 5/1984 | Setzer et al. | |
| 5,525,322 A | 6/1996 | Willms | |
| 6,340,437 B1* | 1/2002 | Yagi .................. | B01J 23/40 252/373 |
| 10,179,326 B2 | 1/2019 | Basset et al. | |
| 2003/0024806 A1* | 2/2003 | Foret .................. | C01B 3/22 204/164 |
| 2005/0221977 A1 | 10/2005 | Fukunaga et al. | |
| 2006/0216227 A1 | 9/2006 | Idem et al. | |
| 2011/0027674 A1 | 2/2011 | Sato et al. | |
| 2012/0273728 A1 | 11/2012 | Abatzoglou et al. | |
| 2013/0206606 A1 | 8/2013 | Gilliam et al. | |
| 2014/0369907 A1 | 12/2014 | Boudreault et al. | |
| 2016/0129423 A1* | 5/2016 | Basset .................. | C07C 2/76 423/651 |
| 2016/0367970 A1 | 12/2016 | Goyal et al. | |
| 2019/0300364 A1 | 10/2019 | Weiss et al. | |
| 2019/0308183 A1 | 10/2019 | Agblevor et al. | |

FOREIGN PATENT DOCUMENTS

| | | |
|---|---|---|
| CN | 107433200 A | 12/2017 |
| CN | 105170155 B | 5/2018 |
| CN | 111097441 A | 5/2020 |
| GB | 714284 A | 8/1954 |
| GB | 916216 A | 1/1963 |
| JP | S60203694 A | 10/1985 |
| JP | 2007084389 A | 4/2007 |
| RU | 2542177 C1 | 2/2015 |
| WO | 0000285 A1 | 1/2000 |
| WO | 2010118133 A1 | 10/2010 |
| WO | 2019138002 A1 | 7/2019 |

OTHER PUBLICATIONS

Balakrishnan et al., "Hydrogen production from methane in the presence of red mud—making mud magnetic," Green Chemistry, 11, 42-47, 2009.
Balakrishnan et al., "Waste materials—catalytic opportunities: an overview of the application of large scale waste materials as resources for catalytic applications," Green Chemistry, 2011, 13, 16.
Bennett et al., "Catalytic Applications of Waste Derived Materials", Journal of Materials Chemistry A, pp. 1-22, 2013.
Dulger Irdem et al. "Steam Reforming of Tar Derived from Walnut Shell and Almond Shell Gasification on Red Mud and Iron-Ceria Catalysts", Energy&Fuels, 2014.
Fang et al., "A Nanomesoporous Catalyst from Modified Red Mud and Its Application for Methane Decomposition to Hydrogen Production," Journal of Nanomaterials, Hindawi, 2016.
Liu et al., "Preparation of Modified Red Mud-Supported Fe Catalysts for Hydrogen Production by Catalytic Methane Decomposition," Journal of Nanomaterials, Article ID 8623463, 2017.
Ortiz et al. "Hydrogen production with CO2 capture by coupling steam reforming of methane and chemical-looping combustion: Use of an iron-based waste product as oxygen carrier burning a PSA tail gas," Journal of Power Sources, 196, pp. 4370-4381, 2011.
International Search Report and Written Opinion of PCT Application No. PCT/US2021/015131 dated May 11, 2021: pp. 1-12.
Theofanidis et al., "Enhanced carbon-resista nt dry reforming Fe—Ni catalyst: Role of Fe," ACS Catal., vol. 5(5), May 26, 2015: pp. 3028-3039.
U.S. Appl. No. 16/775,019, "Nickel-Containing Catalyst Composition Having Enhanced Acidity for Dry Reforming Processes", filed Jan. 28, 2020.
U.S. Appl. No. 16/775,035, "Nickel-Containing Catalyst Composition Having Enhanced Acidity for Steam Reforming Processes", filed Jan. 28, 2020.
U.S. Appl. No. 16/775,063, "Nickel-Containing Catalyst Composition Having Enhanced Acidity for Bi-Reforming Processes", filed Jan. 28, 2020.
U.S. Appl. No. 16/775,081, "Catalyst Carrier for Dry Reforming Processes", filed Jan. 28, 2020.
U.S. Appl. No. 16/775,096, "Catalyst Carrier for Steam Reforming Processes", filed Jan. 28, 2020.
U.S. Appl. No. 16/775,102, "Catalyst Carrier for Autothermal Reforming Processes", filed Jan. 28, 2020.
U.S. Appl. No. 16/775,119, "Catalyst Carrier for Bi-Reforming Processes", filed Jan. 28, 2020.
U.S. Appl. No. 16/775,135, "Catalyst Compositions Having Enhanced Acidity for Dry Reforming Processes", filed Jan. 28, 2020.
U.S. Appl. No. 16/775,147, "Catalyst Compositions Having Enhanced Acidity for Steam Reforming Processes", filed Jan. 28, 2020.
U.S. Appl. No. 16/775,158, "Catalyst Compositions Having Enhanced Acidity for Autothermal Reforming Processes", filed Jan. 28, 2020.
U.S. Appl. No. 16/775,167, "Catalyst Compositions Having Enhanced Acidity for Bi-Reforming Processes", filed Jan. 28, 2020.
Smiciklas et al., "Effect of acid treatment on red mud properties with implications on Ni(II) sorption and stability", Chemical Engineering Journal, 242, 2014, pp. 27-35.
International Search Report and Written Opinion for PCT Application No. PCT/US2021/015132 dated Mar. 29, 2021: pp. 1-12.
International Search Report and Written Opinion for PCT Application No. PCT/US2021/015133 dated Mar. 29, 2021: pp. 1-12.
International Search Report and Written Opinion for PCT Application No. PCT/US2021/015134 dated Mar. 29, 2021: pp. 1-12.
International Search Report and Written Opinion for PCT Application No. PCT/US2021/015188 dated Mar. 29, 2021: pp. 1-11.
International Search Report and Written Opinion for PCT Application No. PCT/US2021/015191 dated Mar. 29, 2021: pp. 1-11.
International Search Report and Written Opinion for PCT Application No. PCT/US2021/015194 dated Mar. 29, 2021: pp. 1-12.
International Search Report and Written Opinion for PCT Application No. PCT/US2021/015196 dated Apr. 14, 2021: pp. 1-11.
International Search Report and Written Opinion for PCT Application No. PCT/US2021/015303 dated Mar. 30, 2021: pp. 1-12.
International Search Report and Written Opinion for PCT Application No. PCT/US2021/015307 dated Mar. 31, 2021: pp. 1-11.
International Search Report and Written Opinion for PCT Application No. PCT/US2021/015370 dated Apr. 14, 2021: pp. 1-11.
International Search Report and Written Opinion for PCT Application No. PCT/US2021/015371 dated Mar. 31, 2021: pp. 1-11.
Cheng et al., "Tar Elimination from Biomass Gasification Syngas with Bauxite Residue Derived Catalysts and Gasification Char," Applied Energy, vol. 258, Nov. 26, 2019: pp. 1-18.
Das et al., "A Review on Advances in Sustainable Energy Production through Various Catalytic Processes by using Catalysts Derived from Waste Red Mud," Renewable Energy, vol. 143, May 31, 2019: pp. 1791-1811.
Duman et al., "Hydrogen Production from Algal Biomass via Steam Gasification," Bioresource Technology, vol. 166, May 5, 2014: pp. 24-30.
Ebrahiminejad et al., "Hydrocracking and Hydrodesulfurization of Diesel over Zeolite Beta-Containing NiMo Supported on Activated Red Mud," Advanced Powder Technology, vol. 30(8), May 17, 2019: pp. 1450-1461.

(56) References Cited

OTHER PUBLICATIONS

Jahromi et al., "Hydrodeoxygenation of Aqueous-Phase Catalytic Pyrolysis Oil to liquid Hydrocarbons Using Multifunctional Nickel Catalyst," Ind. Eng. Chem. Res., vol. 57(39), Sep. 7, 2018: pp. 13257-13268.

Mathur et al., "Ore Catalysts in Two-Stage Coal Liquefaction," Fuel, vol. 65(6), Jun. 1, 1986: pp. 790-796.

Paredes et al., "Catalytic Combustion of Methane over Red Mud-Based Catalysts," Applied Catalysis B Environmental, vol. 47, Jan. 1, 2004: pp. 37-45.

\* cited by examiner

NICKEL-CONTAINING CATALYST COMPOSITION HAVING ENHANCED ACIDITY FOR AUTOTHERMAL REFORMING PROCESSES

BACKGROUND

Field

Embodiments of the disclosure relate to catalyst compositions for use in reforming processes. In particular, certain embodiments of the disclosure relate to nickel-containing catalyst compositions for and methods of autothermal reforming.

Description of the Related Art

Autothermal reforming of methane energetically combines endothermic dry reforming and exothermic partial oxidation of methane, and this provides advantages to autothermal reforming technology for hydrogen production. In autothermal reforming, methane, $CO_2$, and $O_2$ are used to produce carbon monoxide and hydrogen (syngas) as shown below in Equation 1.

$$2CH_4 + CO_2 + O_2 \rightleftharpoons 3H_2 + 3CO + H_2O \quad \text{Eq. 1}$$

One challenge of methane reforming is quick deactivation due to coke formation on the surface of catalysts. In addition, high temperatures for methane conversion can lead to catalyst deactivation by coking or sintering. Nickel catalyst with aluminum oxide and magnesium oxide as supports is used for methane reforming.

Autothermal reforming technology combines dry reforming technology and partial oxidation of methane technology to produce hydrogen in such a manner that the global process is almost thermally neutral or slightly exothermic, thus achieving efficiencies for heat exchange and an operating temperature control framework that reduces hot spot formation to prevent catalyst deactivation by sintering or coking.

However, present catalyst technology is insufficient in some processes to provide cost-effective and durable means for autothermal reforming.

SUMMARY

Applicant has recognized a need for compositions of nickel-modified red mud to be applied in systems and processes for autothermal reforming. An enhanced-acidity nickel-containing catalyst composition is disclosed. The enhanced-acidity nickel-containing catalyst also contains in some embodiments Fe, Al, Si, Na, Ca, and Ti oxides from red mud. In embodiments of the present disclosure, red mud acts as a catalyst in addition to or alternative to a catalyst carrier. Disclosed compositions are useful as a catalyst in autothermal reforming processes for the conversion of methane to syngas, according to Equation 1. Utilization of red mud in autothermal reforming processes provides the concurrent advantages of utilizing a waste material (red mud) and producing useful $H_2$.

Red mud is a caustic waste material of bauxite ore processing for alumina extraction, and is utilized here as a catalyst for an autothermal reforming process. Surprisingly and unexpectedly, without being specifically designed as a catalyst (for example using specific zeolitic structure), red mud waste material can be readily modified for use as a catalyst. Red mud generally includes a mixture of transition metals such as Ti, Fe, and Al, which make it an advantageous catalyst for autothermal reforming processes, for example once modified with nickel.

Embodiments disclosed here apply red mud as an active catalyst support, promotor, in addition to or alternative to catalyst to produce hydrogen through autothermal reforming of methane, optionally followed by a water-gas shift reaction to produce additional $H_2$.

Therefore, disclosed here are methods for autothermal reforming over a modified red mud catalyst composition, one method including providing a methane feed with oxygen and carbon dioxide to react over the modified red mud catalyst composition at increased temperature and increased pressure to produce synthesis gas comprising $H_2$ and CO, the composition comprising: red mud material produced from an alumina extraction process from bauxite ore; and nickel oxide, the nickel oxide present at between about 5 wt. % to about 40 wt. % of the modified red mud catalyst composition. In some embodiments, the increased temperature is between about 500° C. to about 1000° C. In other embodiments, the increased temperature is between about 600° C. to about 800° C. Still in other embodiments, the increased temperature is about 750° C. In certain embodiments, the increased pressure is between about 5 bar and about 20 bar. In some other embodiments, the increased pressure is between about 10 bar and about 15 bar. In yet other embodiments, the increased pressure is about 14 bar.

Still in other embodiments of autothermal reforming, the methane conversion rate is at least about 40% for at least about 6 hours. In certain other embodiments, gas hourly space velocity of the methane feed and carbon dioxide feed mixed is between about 1000 $h^{-1}$ to 10000 $h^{-1}$. Still in other embodiments, the composition includes at least one component selected from the group consisting of: $Fe_2O_3$, $Al_2O_3$, $SiO_2$, $Na_2O$, CaO, and $TiO_2$. In some embodiments, a majority of the particles of the composition have a particle size of less than about 70 μm. In other embodiments, the nickel oxide is present at between about 10 wt. % to about 30 wt. % of the modified red mud catalyst composition. Still in other embodiments, the nickel oxide is present at between about 15 wt. % to about 25 wt. % of the modified red mud catalyst composition. In certain embodiments, the nickel oxide is present at about 20 wt. % of the modified red mud catalyst composition.

In some embodiments, methane conversion is greater than at least about 40% for at least about 6 hours. In other embodiments, a molar ratio is about 2:1:1 for $CH_4:CO_2:O_2$. Still in other embodiments, produced $H_2$ is at least about 25 mol. % of produced products from the reaction for at least about 5 hours. In yet other embodiments, the Brunauer-Emmett-Teller (BET) surface area of the modified red mud catalyst composition is between about 50 $m^2/g$ and about 90 $m^2/g$. In certain embodiments, the composition includes between about 5 wt. % and about 20 wt. % $Al_2O_3$, between about 2 wt. % and about 10 wt. % CaO, between about 20 wt. % and about 40 wt. % $Fe_2O_3$, between about 5 wt. % and about 20 wt. % $SiO_2$, and between about 10 wt. % and about 20 wt. % $TiO_2$.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
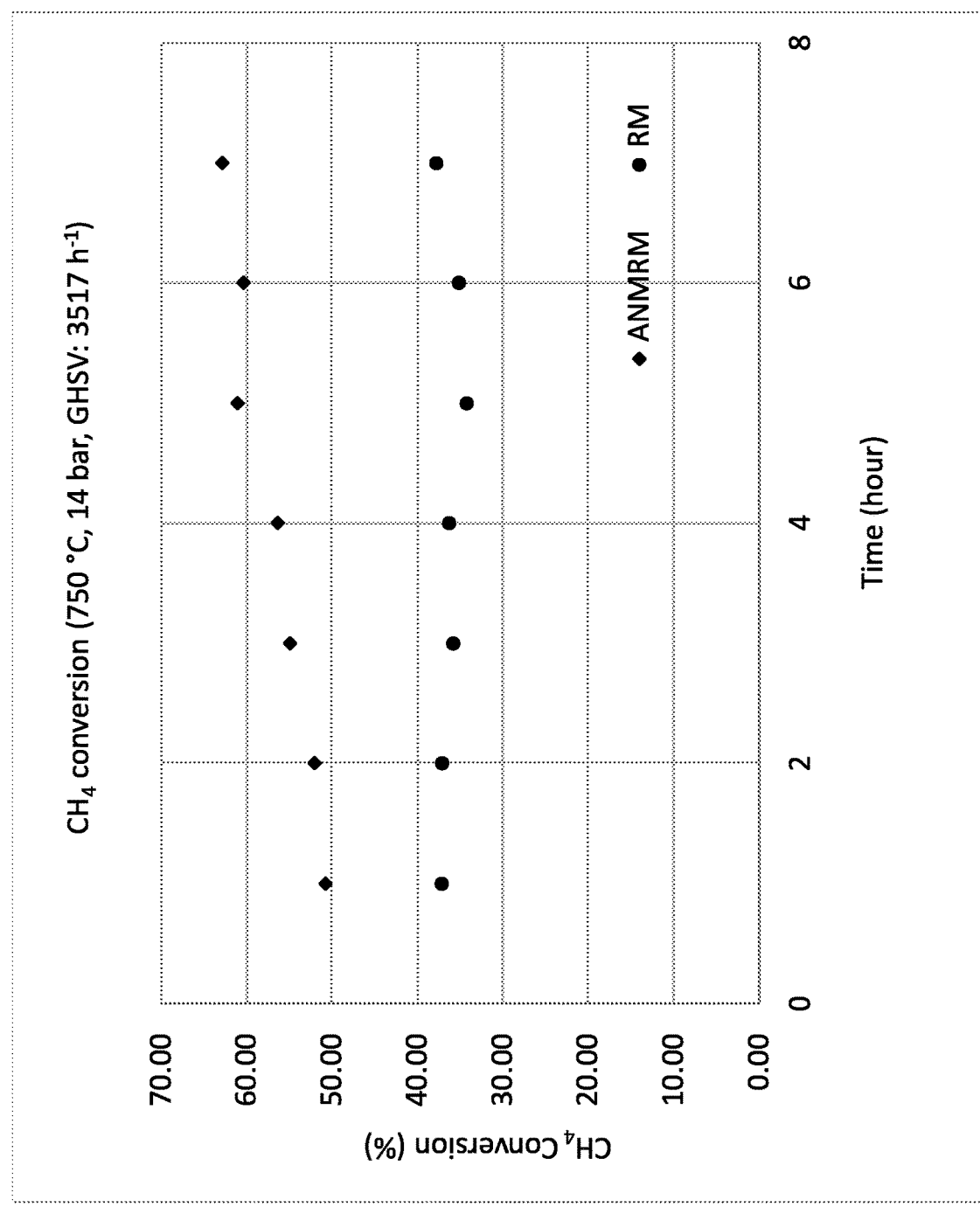
FIG. 1 is a graph showing conversion percentage for $CH_4$ in an autothermal reforming process for unmodified red mud (RM) used as a catalyst and for acid nickel-modified red mud (ANMRM) used as a catalyst.

So that the manner in which the features and advantages of the embodiments of compositions of nickel-modified red mud along with systems and methods for autothermal reforming with such compositions and for producing such compositions, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

As noted, red mud is a caustic waste material generated during alumina extraction from bauxite ore. Red mud includes a mixture of transition metals, for example as listed in Table 1.

TABLE 1

| Example composition ranges for global red mud. | | | | | | |
|---|---|---|---|---|---|---|
| Component | $Fe_2O_3$ | $Al_2O_3$ | $SiO_2$ | $Na_2O$ | CaO | $TiO_2$ |
| Approx. Weight Percentage | 30-60% | 10-20% | 3-50 % | 2-10% | 2-8% | 10% |

Red mud was modified with nickel to be utilized and tested as a catalyst for autothermal reforming as follows. The unmodified red mud used as a catalyst precursor contained no detectable nickel. Saudi Arabian red mud from Ma'aden Aluminium Company, based at Ras Al Khair, Saudi Arabia was used to prepare a modified catalyst composition. Table 2 shows the weight percent for certain components in the unmodified Saudi Arabian red mud composition.

TABLE 2

| Certain component weight percentages in unmodified Saudi Arabian red mud (RM) catalyst/catalyst support composition. | | | | | | |
|---|---|---|---|---|---|---|
| Component | $Fe_2O_3$ | $Al_2O_3$ | $SiO_2$ | $Na_2O$ | CaO | $TiO_2$ |
| Weight Percentage | 18.75% | 25.22% | 18.88% | 11.77% | 7.97% | 6.89% |

The untreated red mud exhibited a Brunauer-Emmett-Teller (BET) surface area of about 16 $m^2/g$.

Table 3 shows an example composition for one embodiment of produced ANMRM for use as a modified catalyst.

TABLE 3

| Example composition for a produced ANMRM used as a catalyst. | | | | | | | |
|---|---|---|---|---|---|---|---|
| Component | $Fe_2O_3$ | $Al_2O_3$ | $SiO_2$ | $Na_2O$ | CaO | $TiO_2$ | NiO |
| Weight Percentage | 32% | 12.4% | 8.5% | 0.08% | 3.8% | 15% | 24% |

Because red mud is a highly variable waste material, elemental composition will vary between samples and test results.

Catalyst Preparation. An acid nickel-modified red mud (ANMRM) catalyst with 18.6 wt. % nickel metal was prepared using a homogeneous precipitation process. Using an unmodified red mud catalyst precursor, 20 wt. % of nickel was targeted to be loaded in the red mud to enhance autothermal reforming activity, and 18.6 wt. % of nickel was confirmed by X-ray fluorescence (XRF) analysis (about 24% nickel oxide, also referred to as NiO). Depending on the catalyst application, nickel oxide can be loaded to a red mud precursor from between about 1 wt. % to about 50 wt. %. Nickel can be combined with red mud to result in nickel(II) oxide, NiO, in addition to or alternative to nickel(III) oxide, $Ni_2O_3$.

BET surface area analysis showed unmodified red mud surface area was about 16 $m^2/g$. BET surface area for acid modified red mud was about 170 $m^2/g$. BET surface area for acid modified red mud with nickel in addition to or alternative to molybdenum loading is, in some embodiments, between about 50 $m^2/g$ and about 90 $m^2/g$, for example about 63 $m^2/g$ or about 89 $m^2/g$.

First, 10 g of Saudi Arabian red mud from Ma'aden Aluminium Company, based at Ras Al Khair, Saudi Arabia was modified by dissolving dried, unmodified red mud in 100 mL of deionized water, and then the pH was neutralized using 40.5 mL of 37 wt. % hydrochloric acid. Afterward, 10 g of nickel(II) nitrate hexahydrate was dissolved in 50 mL of ethanol. The two solutions were mixed, and the final solution was precipitated by slowly adding between about 20 mL to about 30 mL aqueous ammonia with stirring until pH reached 8. Then, the mixed solution was filtered, dried in an oven at 105° C., and calcined at 600° C. for 4 hours. The final ANMRM product was ground to have a particle size of less than about 70 μm. The step of drying in an oven can last from about 2 to about 24 hours.

Other nickel-containing compounds can be used in addition to or alternative to nickel nitrate, including any nickel-containing compounds soluble in ethanol or other organic or inorganic alcohols, or in aqueous ammonia. Nickel can be combined with red mud to result in nickel(II) oxide, NiO, in addition to or alternative to nickel(III) oxide, $Ni_2O_3$.

Catalyst testing. Several tests on red mud catalytic activity and ANMRM catalytic activity for autothermal reforming were experimentally conducted. Red mud was tested as received without any modifications. It was placed in in a Micromeritics® PID Eng & Tech brand microactivity reactor designed for catalyst activity and selectivity analysis, and the same was done for the prepared ANMRM catalyst. The results are compared, for example, in FIGS. 1 and 2. Results show that ANMRM catalytic activity for autothermal reforming is advantageously improved over non-modified red mud catalytic activity for autothermal reforming.

FIG. 1 is a graph showing conversion percentage for $CH_4$ in an autothermal reforming process for unmodified red mud (RM) used as a catalyst and for ANMRM used as a catalyst. Effects of nickel addition to red mud were studied. Experimental conditions in the autothermal reforming reactor included temperature at about 750° C., pressure at about 14 bar, and gas hourly space velocity (GHSV) at about 3517 $h^{-1}$. The test was conducted for 7 hours. The feed was 50 mol. % methane, 25 mol. % $CO_2$, and 25 mol. % $O_2$ for both catalysts tested. The GHSV was calculated for the mixed feed. GHSV generally measures the flow rate of the feed gases divided by the catalyst volume, which indicates the residence time of the reactants on the catalyst. For autothermal reforming, the feed composition can comprise, consist of, or consist essentially of $CH_4$, $CO_2$, and 02. Based in part on thermodynamics, the molar ratio can be about 2:1:1 for $CH_4:CO_2:O_2$.

Methane conversion illustrated in FIG. 1 shows ANMRM catalyst outperformed its counterpart, the untreated red mud. Methane conversion by ANMRM reached up to about 65%. On the other hand, unmodified red mud methane conversion maxed out at about 40%. Slight conversion activity of unmodified red mud could be attributed to the existence of several transition metals within red mud, and the greater conversion rate of ANMRM can be attributed to the addition of nickel and synergies of the nickel with the existing transition metals in the red mud.

Figure 2:
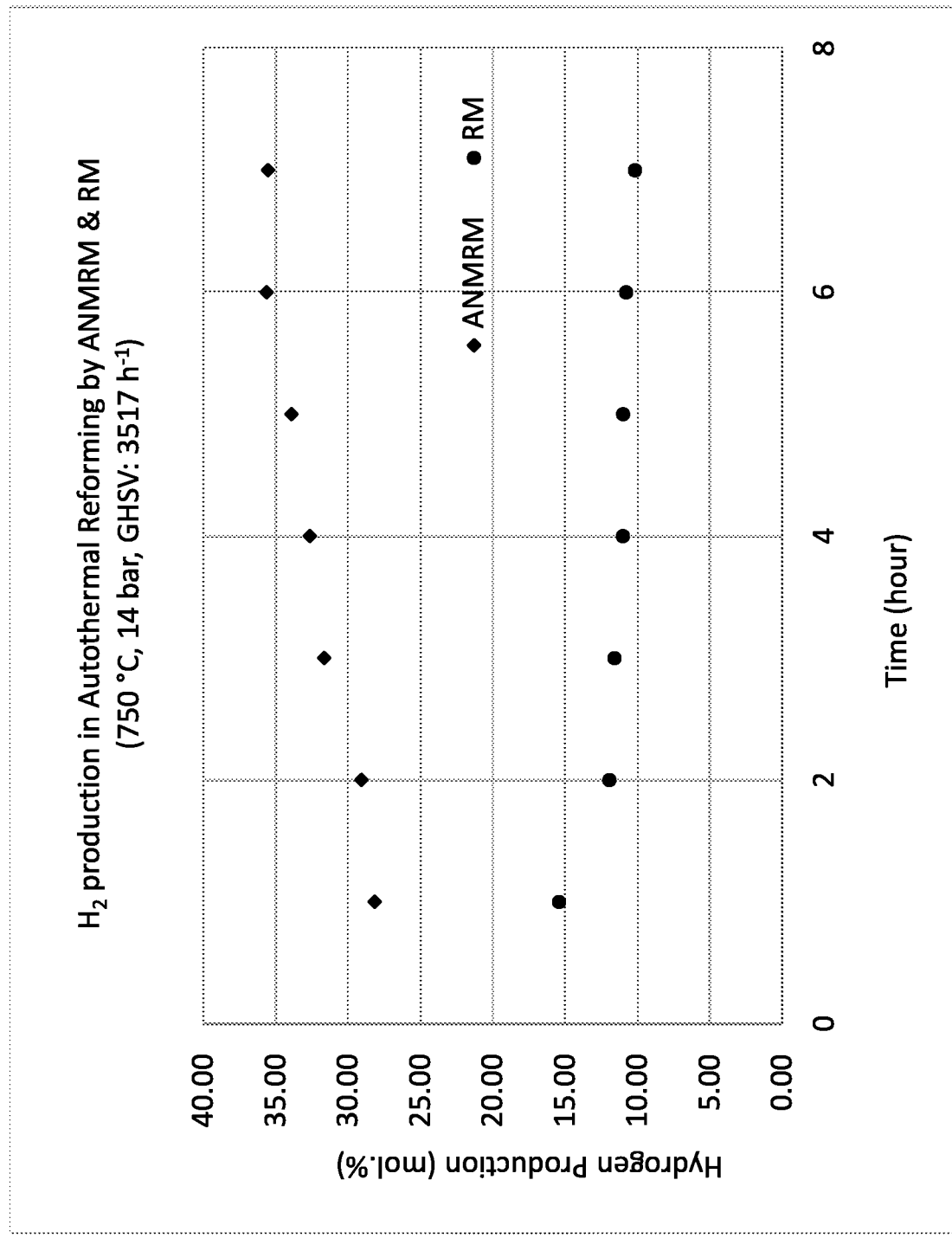
FIG. 2 is a graph showing mol. % of $H_2$ out of the total products produced from autothermal reforming of $CH_4$ in an autothermal reforming process for unmodified red mud used as a catalyst and for ANMRM used as a catalyst.

FIG. 2 is a graph showing mol. % of $H_2$ out of the total products produced from autothermal reforming of $CH_4$ in an autothermal reforming process for unmodified red mud used as a catalyst and for ANMRM used as a catalyst. Hydrogen production illustrated in FIG. 2 shows that untreated red mud produced low amounts of hydrogen, whereas ANMRM catalyst produced up to about 35 mol. % hydrogen. Nickel modification of red mud has enhanced the performance significantly.

The singular forms "a," "an," and "the" include plural referents, unless the context clearly dictates otherwise. The term "about" when used with respect to a value or range refers to values including plus and minus 5% of the given value or range.

In the drawings and specification, there have been disclosed example embodiments of the present disclosure, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

That claimed is:

1. A method for autothermal reforming over a modified red mud catalyst composition, the method comprising the steps of:
    providing a methane feed with oxygen and carbon dioxide to react in an autothermal reforming reaction over the modified red mud catalyst composition at a temperature between about 500° C. to about 1000° C. and a pressure between about 5 bar and about 20 bar to produce synthesis gas comprising $H_2$ and CO, the modified red mud catalyst composition comprising:
    red mud material produced from an alumina extraction process from bauxite ore with a weight ratio of aluminum oxide to iron oxide of about 1:0.74 and a weight ratio of aluminum oxide to titanium oxide of about 1:0.27; and
    nickel oxide, the nickel oxide present at between about 5 wt. % to about 40 wt. % of the modified red mud catalyst composition.

2. The method according to claim 1, where the temperature is between about 600° C. to about 800° C.

3. The method according to claim 1, where the temperature is about 750° C.

4. The method according to claim 1, where the pressure is between about 10 bar and about 15 bar.

5. The method according to claim 1, where the pressure is about 14 bar.

6. The method according to claim 1, where gas hourly space velocity of the methane feed with oxygen and carbon dioxide is between about 1000 $h^{-1}$ to 10000 $h^{-1}$.

7. The method according to claim 1, where the composition includes at least one component selected from the group consisting of: $Fe_2O_3$, $Al_2O_3$, $SiO_2$, $Na_2O$, CaO, and $TiO_2$.

8. The method according to claim 1, where the modified red mud catalyst composition comprises particles and where a majority of the particles of the modified red mud catalyst composition have a particle size of less than about 70 μm.

9. The method according to claim 1, where the nickel oxide is present at between about 10 wt. % to about 30 wt. % of the modified red mud catalyst composition.

10. The method according to claim 1, where the nickel oxide is present at between about 15 wt. % to about 25 wt. % of the modified red mud catalyst composition.

11. The method according to claim 1, where the nickel oxide is present at about 20 wt. % of the modified red mud catalyst composition.

12. The method according to claim 1, where methane conversion is greater than at least about 40% for at least about 6 hours.

13. The method according to claim 1, where a molar ratio is about 2:1:1 for $CH_4:CO_2:O_2$.

14. The method according to claim 1, where produced $H_2$ is at least about 25 mol. % of produced products from the reaction for at least about 5 hours.

15. The method according to claim 1, where the Brunauer-Emmett-Teller (BET) surface area of the modified red mud catalyst composition is between about 50 $m^2/g$ and about 90 $m^2/g$.

16. The method according to claim 1, where the composition includes between about 2 wt. % and about 10 wt. % CaO, and between about 5 wt. % and about 20 wt. % $SiO_2$.

* * * * *